US012661997B2

(12) United States Patent
Liu et al.

(10) Patent No.: US 12,661,997 B2
(45) Date of Patent: Jun. 23, 2026

(54) CONTROL DEVICE FOR VEHICLE

(71) Applicant: DENSO CORPORATION, Kariya-city (JP)

(72) Inventors: Haibo Liu, Kariya-city (JP); Keisuke Kawai, Kariya-city (JP); Akira Sakamoto, Kariya-city (JP); Shigeru Kamio, Kariya-city (JP); Tatsuya Takagi, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 264 days.

(21) Appl. No.: 18/541,414

(22) Filed: Dec. 15, 2023

(65) Prior Publication Data

US 2024/0123834 A1 Apr. 18, 2024

Related U.S. Application Data

(63) Continuation of application No. PCT/JP2022/020608, filed on May 18, 2022.

(30) Foreign Application Priority Data

Jun. 15, 2021 (JP) ................................ 2021-099280

(51) Int. Cl.
B60L 7/26 (2006.01)
(52) U.S. Cl.
CPC ............. B60L 7/26 (2013.01); B60L 2240/12 (2013.01); B60L 2240/423 (2013.01)
(58) Field of Classification Search
None
See application file for complete search history.

(56) References Cited

U.S. PATENT DOCUMENTS

| | | | |
|---|---|---|---|
| 10,328,803 B2 | 6/2019 | Komatsu et al. | |
| 10,549,641 B2 | 2/2020 | Okano et al. | |
| 2007/0191181 A1* | 8/2007 | Burns .............. | B60W 30/18118 477/40 |
| 2012/0161504 A1* | 6/2012 | Higuma .................. | B60L 7/26 303/3 |
| 2013/0060440 A1 | 3/2013 | Fukushiro | |

FOREIGN PATENT DOCUMENTS

| | | |
|---|---|---|
| JP | 2003-087904 A | 3/2003 |
| JP | 2007-196924 A | 8/2007 |

* cited by examiner

Primary Examiner — Navid Z. Mehdizadeh
Assistant Examiner — Jason R Roberson
(74) Attorney, Agent, or Firm — Oliff PLC

(57) ABSTRACT

A control device includes a switching control unit, an information acquisition unit, and a difference acquisition unit. The switching control unit performs switching control that increases braking torque of the braking device while decreasing braking torque of the rotating electrical machine, when a vehicle is decelerated. The information acquisition unit acquires information on a state of the vehicle. The difference acquisition unit acquires a braking torque difference indicating a difference between braking torque required for keeping a stopped state of the vehicle and braking torque of the braking device, when the vehicle is stopped. After the information acquisition unit detects the stopped state of the vehicle, the switching control unit corrects output torque of the rotating electrical machine based on the braking torque difference.

7 Claims, 7 Drawing Sheets

FIG.4

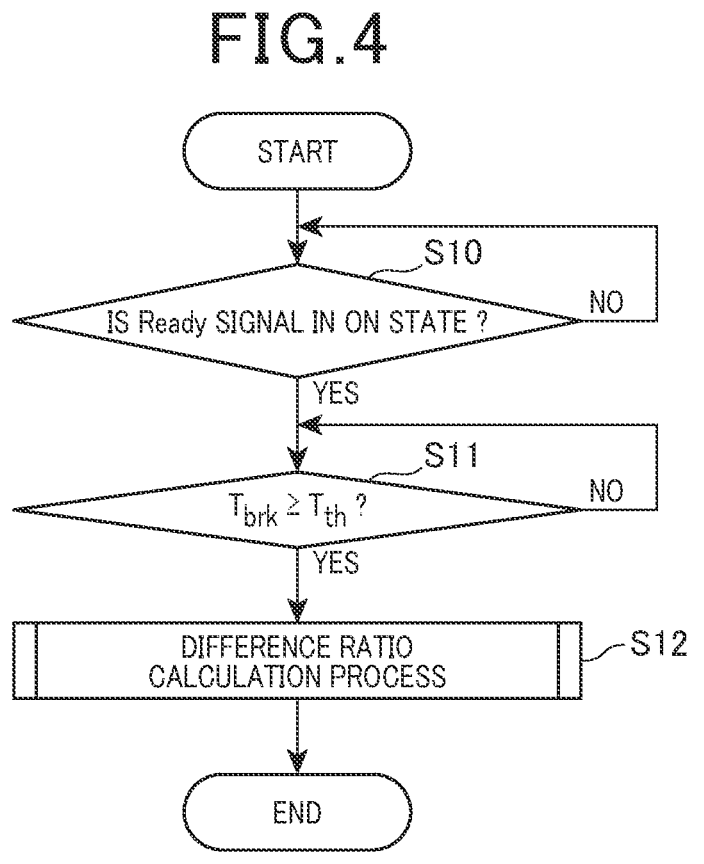

```
                    ┌──────────────┐
                    │    START     │
                    └──────┬───────┘
                           ↓
                          ◇ ──────────── S10
                     ◇         ◇
                ◇                   ◇           NO
              ◇  IS Ready SIGNAL IN ON STATE ?  ◇─────────┐
                ◇                   ◇                      │
                     ◇         ◇                           │
                          ◇                                │
                           │ YES                           │
                           ↓                               │
                          ◇ ──────────── S11               │
                     ◇         ◇                           │
                ◇                   ◇         NO            │
              ◇      T_brk ≥ T_th ?            ◇────────────┤
                ◇                   ◇                       │
                     ◇         ◇                            │
                          ◇                                 │
                           │ YES                            │
                           ↓                                │
         ┌─────────────────────────────────────┐           │
         │          DIFFERENCE RATIO            │── S12     │
         │       CALCULATION PROCESS            │           │
         └─────────────────┬───────────────────┘           │
                           ↓                                │
                    ┌──────────────┐                        │
                    │     END      │                        │
                    └──────────────┘                        │
```

IS Ready SIGNAL IN ON STATE ?  S10  NO  YES $T_{brk} \geq T_{th}$ ?  S11  NO  YES

DIFFERENCE RATIO CALCULATION PROCESS  S12

FIG.5

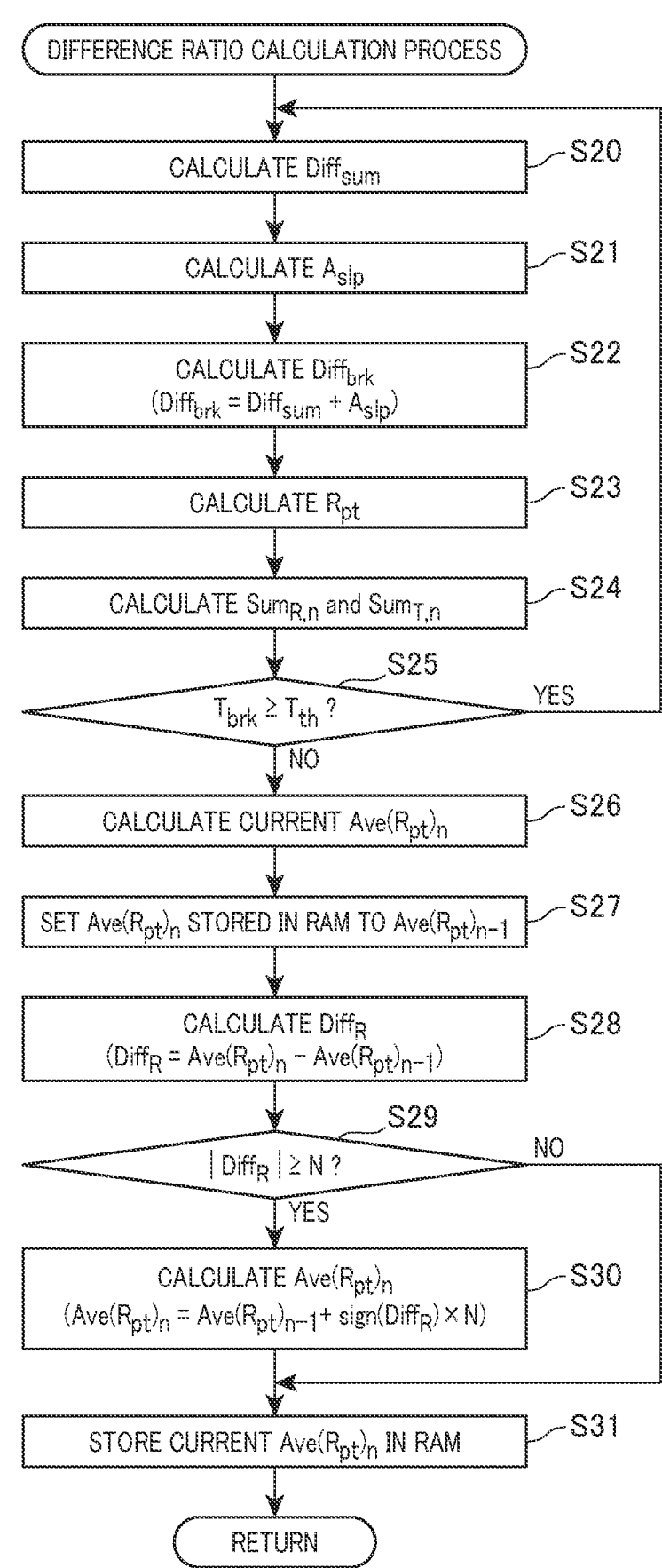

DIFFERENCE RATIO CALCULATION PROCESS

CALCULATE $Diff_{sum}$ —— S20

CALCULATE $A_{slp}$ —— S21

CALCULATE $Diff_{brk}$
($Diff_{brk} = Diff_{sum} + A_{slp}$) —— S22

CALCULATE $R_{pt}$ —— S23

CALCULATE $Sum_{R,n}$ and $Sum_{T,n}$ —— S24

S25
$T_{brk} \geq T_{th}$ ?　　YES

NO

CALCULATE CURRENT $Ave(R_{pt})_n$ —— S26

SET $Ave(R_{pt})_n$ STORED IN RAM TO $Ave(R_{pt})_{n-1}$ —— S27

CALCULATE $Diff_R$
($Diff_R = Ave(R_{pt})_n - Ave(R_{pt})_{n-1}$) —— S28

S29
$|Diff_R| \geq N$ ?　　NO

YES

CALCULATE $Ave(R_{pt})_n$
($Ave(R_{pt})_n = Ave(R_{pt})_{n-1} + sign(Diff_R) \times N$) —— S30

STORE CURRENT $Ave(R_{pt})_n$ IN RAM —— S31

RETURN

BASIC BRAKING
TORQUE

VEHICLE SPEED Vc

REGENERATIVE TORQUE
REQUIRED VALUE

OUTPUT TORQUE OF MG

BRAKING TORQUE
REQUIRED VALUE

BRAKING TORQUE OF
BRAKING DEVICE

CONTROL DEVICE FOR VEHICLE

CROSS-REFERENCE TO RELATED APPLICATION

The present application is based on and claims the benefit of priority from earlier Japanese Patent Application No. 2021-099280 filed on Jun. 15, 2021, the entire description of which is incorporated herein by reference.

BACKGROUND

Technical Field

The present disclosure relates to a control device for a vehicle.

Related Art

As conventional art, a control device for a vehicle is disclosed. The vehicle is provided with a rotating electrical machine that is capable of functioning as a generator to generate braking torque by regenerative torque and a brake control device that electrically controls braking torque of a mechanical brake provided to wheels. The control unit performs switching control that switches between braking torque generated by the rotating electrical machine and braking torque generated by the mechanical brake while keeping target braking torque.

SUMMARY

An aspect of the present disclosure provides a control device for a movable body, the control device being installed in the movable body that has a braking device capable of applying braking torque to a wheel and a rotating electrical machine capable of applying braking torque to the wheel by regenerative operation. The control device includes: a switching control unit that performs switching control that increases braking torque of the braking device while decreasing braking torque of the rotating electrical machine, when the movable body is decelerated; an information acquisition unit that acquires information on a state of the movable body; and a difference acquisition unit that acquires a braking torque difference indicating a difference between braking torque required for keeping stopped state of the vehicle and braking torque of the braking device, when the movable body is stopped. After the information acquisition unit detects the stopped state of the movable body, the switching control unit corrects output torque of the rotating electrical machine based on the braking torque difference.

BRIEF DESCRIPTION OF THE DRAWINGS

In the accompanying drawings:

FIG. 4 is a flowchart illustrating a procedure of a process performed by a traveling control ECU according to the embodiment;

FIG. 5 is a flowchart illustrating a procedure of a deviation ratio calculation process performed by the traveling control ECU according to the embodiment;

DETAILED DESCRIPTION OF THE PREFERRED EMBODIMENTS

Figure 1:
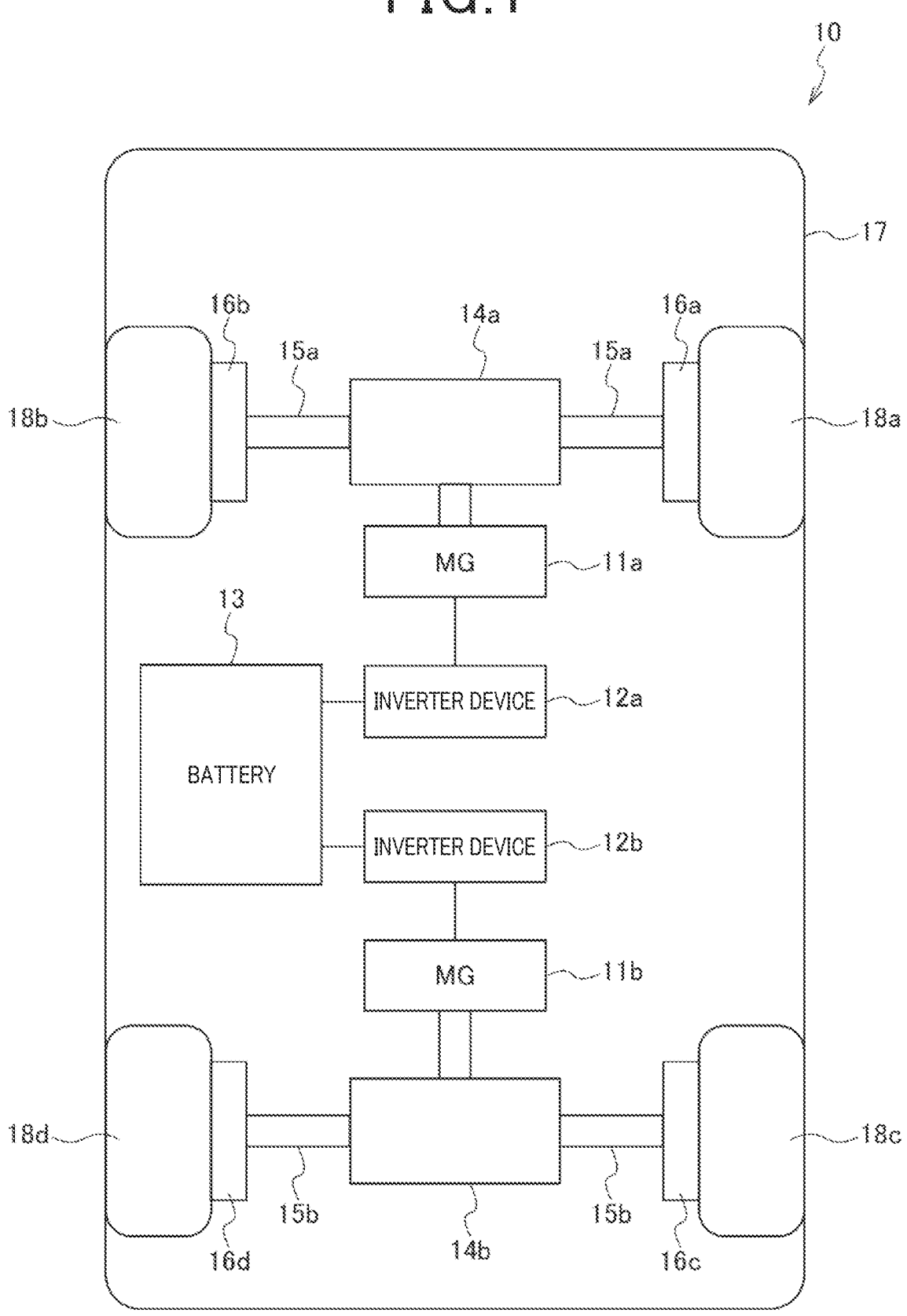
FIG. 1 is a block diagram illustrating a schematic configuration of a vehicle according to an embodiment.

As conventional art, JP-A-2013-56587 discloses a control device for a vehicle. The vehicle is provided with a rotating electrical machine that is capable of functioning as a generator to generate braking torque by regenerative torque and a brake control device that electrically controls braking torque of a mechanical brake provided to wheels. The control unit performs switching control that switches between braking torque generated by the rotating electrical machine and braking torque generated by the mechanical brake while keeping target braking torque.

Specifically, after the vehicle starts decelerating based on the braking torque of the rotating electrical machine, when the speed of the vehicle lowers to a predetermined switching start speed, the control device starts the switching control. Thereafter, during a time period during which the speed of the vehicle decreases from the switching start speed to a switching end speed, while keeping the total torque obtained by summing the braking torque of the rotating electrical machine and the braking torque of the mechanical brake to the target braking torque, the control device decreases the braking torque of the rotating electrical machine and increases the braking torque of the mechanical brake. When the speed of the vehicle reaches the switching end speed, the switching from the braking torque of the rotating electrical machine to the braking torque of the mechanical brake has been completed. While the switching control is performed, that is, when the switching from the braking torque of the rotating electrical machine to the braking torque of the mechanical brake is being performed, if the braking torque of the vehicle deviates from the target braking torque, the control device corrects the braking torque of the rotating electrical machine so that the mount of deviation decreases. The control device calculates the braking torque of the vehicle based on estimated surface resistance, coasting torque, vehicle acceleration, a differential ratio, a tire diameter, and reference vehicle weight.

According to the control device for a vehicle described in JP-A-2013-56587, for example, when the acceleration of the vehicle changes greatly while the switching control is performed, the calculated value of the braking torque of the vehicle suddenly changes. Hence, the amount of correction of the braking torque of the rotating electrical machine changes greatly. For example, when the vehicle drives over a curb while the switching control is performed, or a road surface on which the vehicle travels changes from a flat surface to a sloping surface, the acceleration of the vehicle changes greatly. As a result, the amount of correction of the braking torque of the rotating electrical machine may increase. In such a case, since control torque of the rotating electrical machine suddenly changes, the vehicle cannot be stopped smoothly. This causes the ride in the car to be uncomfortable.

The present disclosure has been made in light of such circumstances as stated above and aims to provide a control device for a movable body, the control device being capable of stop the movable body more smoothly.

Hereinafter, an embodiment of a control device for a vehicle will be described with reference to the drawings. To facilitate understanding descriptions, the same components are denoted by the same reference sign as much as possible in the drawings to omit redundant description.

First, the schematic configuration of the vehicle to which the control device of the present embodiment is installed will be described. As illustrated in FIG. 1, a vehicle 10 includes a front MG (Motor Generator) 11a, a rear MG 11b, a front inverter device 12a, a rear inverter device 12b, and a battery 13. The vehicle 10 is a so-called electric vehicle that travels based on power of the MGs 11a, 11b. In the present embodiment, the vehicle 10 corresponds to a movable body.

The inverter devices 12a, 12b convert DC power stored in the battery 13 to AC power and supply the converted AC power to the MGs 11a, 11b.

The MGs 11a, 11b are rotating electrical machines operating as a motor and a generator. When operating as a motor, the MGs 11a, 11b are driven based on AC power supplied from the inverter devices 12a, 12b, respectively. In the vehicle 10, driving force of the front MG 11a is transferred to a right front wheel 18a and a left front wheel 18b via a front drive train 14a and a front drive shaft 15a, whereby the front wheels 18a, 18b rotate. Similarly, driving force of the rear MG 11b is transferred to a right rear wheel 18c and a left rear wheel 18d via a rear drive train 14b and a rear drive shaft 15b, whereby the rear wheels 18c, 18d rotate. As described above, the vehicle 10 is a so-called four-wheel drive vehicle in which the four wheels 18a to 18d function as driving wheels.

The MGs 11a, 11b perform regenerative operation when the vehicle 10 is braked, thereby operating as a generator. Specifically, when the vehicle 10 is braked, braking torque applied to the right front wheel 18a and the left front wheel 18b is input to the front MG 11a via the front drive shaft 15a and the front drive train 14a. The front MG 11a generates power based on torque reversely input from the front wheels 18b, 18c. AC power generated by the front MG 11a is converted to DC power by the front inverter device 12a and is charged in the battery 13. Similarly, AC power generated by the rear MG 11b is converted to DC power by the rear inverter device 12b and is charged in the battery 13.

The four wheels 18a to 18d are provided with braking devices 16a to 16d, respectively. The braking devices 16a to 16d are components of a hydraulic braking system 20 illustrated in FIG. 2. The hydraulic braking system 20 drives the braking devices 16a to 16d based on a depressing operation of a brake pedal 21 by the driver to apply frictional force to the wheels 18a to 18d, thereby applying braking force to the vehicle 10.

Figure 2:
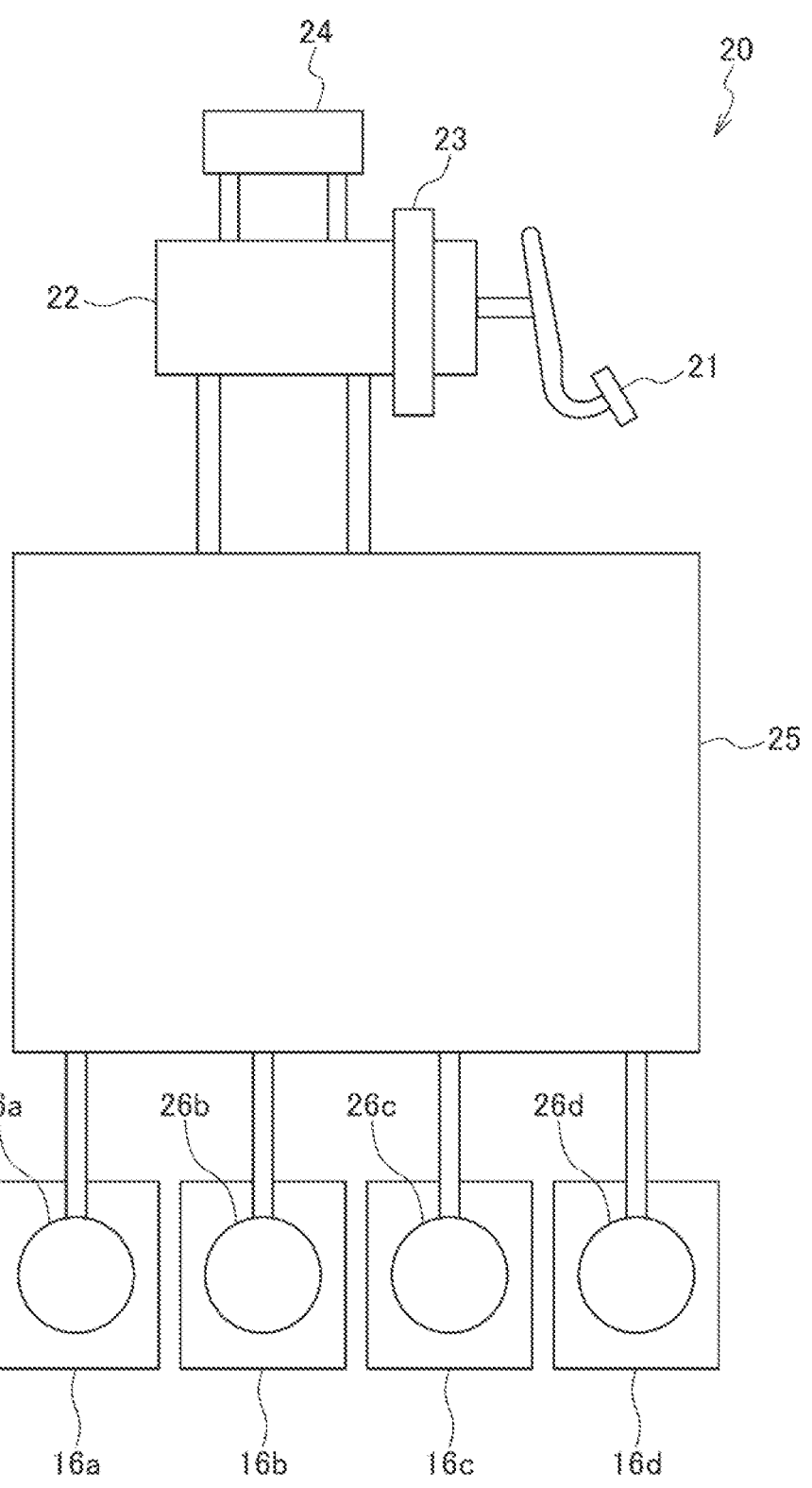
FIG. 2 is a block diagram illustrating a schematic configuration of a brake system according to the embodiment.

Specifically, as illustrated in FIG. 2, the hydraulic braking system 20 includes the brake pedal 21, a master cylinder 22, a booster 23, a reservoir tank 24, a hydraulic circuit 25, and the braking devices 16a to 16d.

The master cylinder 22 causes brake oil to generate hydraulic pressure based on a depressing operation of the brake pedal 21 by the driver. The brake pedal 21 is connected with the booster 23. The master cylinder 22 is fixed to the booster 23. The booster 23 converts, at the master cylinder 22, pressure applied to the brake pedal 21 by a depressing operation by the driver to brake hydraulic pressure depending on the manipulated variable of the brake pedal 21. In the present embodiment, brake hydraulic pressure in the master cylinder 22 is also referred to as master cylinder pressure. The master cylinder 22 is provided with a master cylinder pump, not shown, which can adjust the master cylinder pressure by applying pressure in the master cylinder 22. The top of the master cylinder 22 is provided with the reservoir tank 24. When the depressing operation of the brake pedal 21 is released, the master cylinder 22 and the reservoir tank 24 are in a connected state.

The hydraulic circuit 25 is provided between the master cylinder 22 and the braking devices 16a to 16d, and adjusts and transfers hydraulic pressure of brake oil between the master cylinder 22 and the braking devices 16a to 16d. In the present embodiment, the hydraulic pressure of brake oil corresponds to fluid pressure.

The braking devices 16a to 16d have wheel cylinders 26a to 26d, respectively. Hydraulic pressure of brake oil is transferred from the hydraulic circuit 25 to the wheel cylinders 26a to 26d, whereby the wheel cylinders 26a to 26d apply braking force to the wheels 18a to 18d, respectively. As the braking devices 16a to 16d configured by the wheel cylinders 26a to 26d, various types of braking devices such as drum-type and disk-type braking devices can be used.

The vehicle 10 has various sensors for detecting states thereof.

Figure 3:
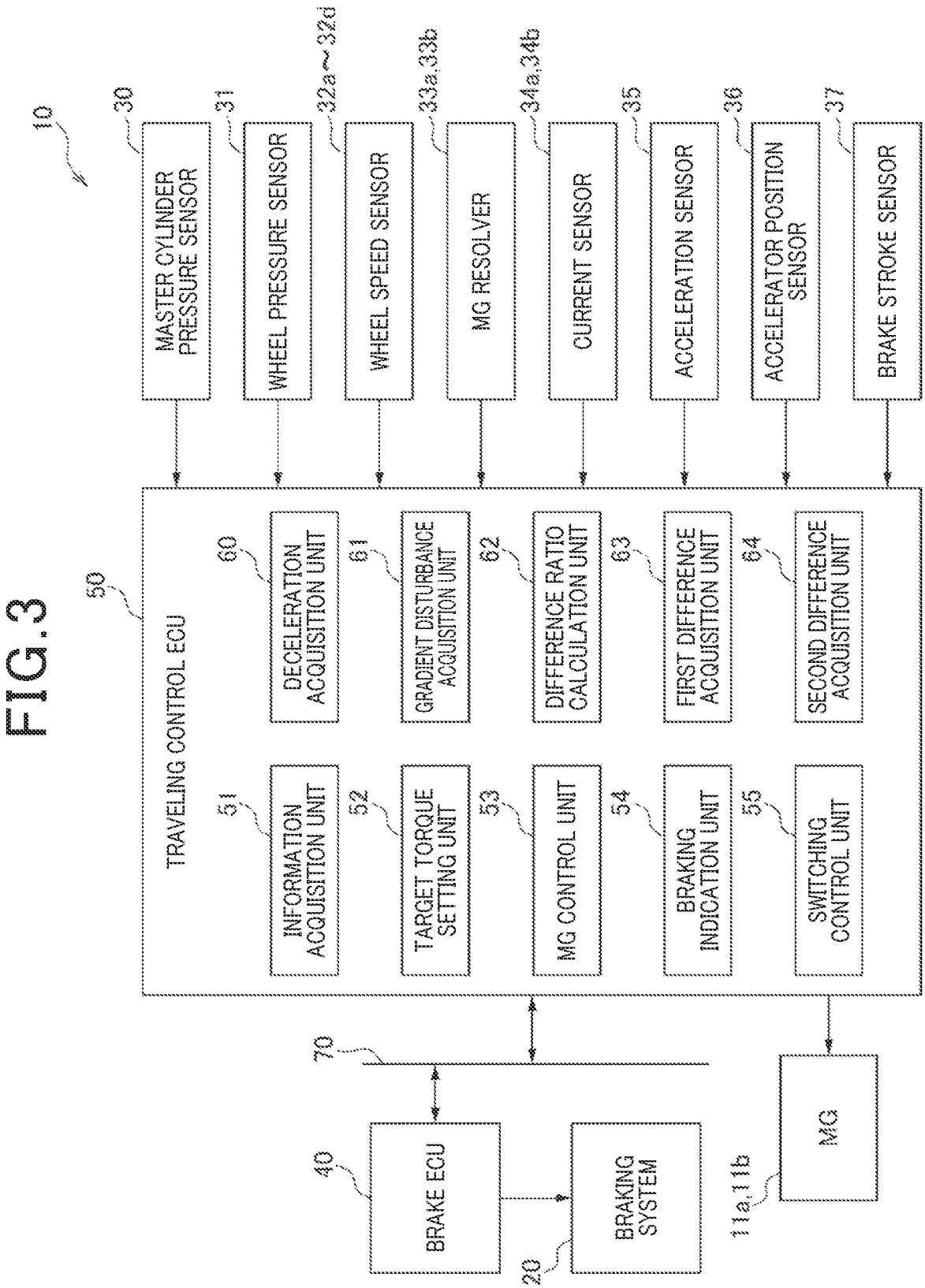
FIG. 3 is a block diagram illustrating an electrical configuration of the vehicle according to the embodiment.

As illustrated in FIG. 3, the vehicle 10 has, for example, a master cylinder pressure sensor 30, a wheel pressure sensor 31, wheel speed sensors 32a to 32d, MG resolvers 33a, 33b, current sensors 34a, 34b, an acceleration sensor 35, an accelerator position sensor 36, and a brake stroke sensor 37.

The master cylinder pressure sensor 30 detects master cylinder pressure $P_{mc}$, which is internal pressure of the master cylinder 22 illustrated in FIG. 2. The wheel pressure sensor 31 detects wheel pressure $P_{wc}$, which is internal pressure of the wheel cylinders 26a to 26d illustrated in FIG. 2. The wheel speed sensors 32a to 32d are respectively provided to the four wheels 18a to 18d and respectively detect wheel speeds $\omega_{wh}(a)$ to $\omega_{wh}(d)$, which are the number of rotations per unit time of the wheels 18a to 18d. The MG resolvers 33a, 33b are respectively provided to the two MGs 11a, 11b and respectively detect MG rotating speeds $\omega_{fmg}$, $\omega_{rmg}$, which are the number of rotations per unit time of output shafts of the MGs 11a, 11b. The current sensors 34a, 34b are also respectively provided to the two MGs 11a, 11b and respectively detect driving currents $I_{mg}(a)$, $I_{mg}(b)$, which are supplied to the MGs 11a, 11b.

The acceleration sensor 35 is mounted to a vehicle body 17 illustrated in FIG. 1 and detects an acceleration $A_{sen}$ of the vehicle 10. The acceleration sensor 35 is a so-called 6-axis acceleration sensor that can detect, for example, in addition to an acceleration in each of the longitudinal direction, the horizontal direction, and the vertical direction of the vehicle body 17, an acceleration in each of the pitch direction, the roll direction, and the yaw direction. The accelerator position sensor 36 detects a depression amount Sa of the accelerator pedal of the vehicle 10. The brake stroke sensor 37 detects a depression amount Sb of the brake pedal 21 illustrated in FIG. 2.

The vehicle 10 includes various ECUs (Electronic Control Units) for controlling a plurality of devices installed therein. As illustrated in FIG. 3, the vehicle 10 includes, for example, a brake ECU 40 and a traveling control ECU 50. Each of the ECUs 40, 50 is mainly configured by a microcomputer having a CPU, a ROM, a RAM, and the like. The ECUs 40, 50 can communicate various pieces of information to each other via an in-vehicle network 70 provided to the vehicle 10.

The brake ECU 40 executes a program previously stored in the ROM thereof to control the hydraulic braking system 20. For example, the brake ECU 40 controls the hydraulic braking system 20 based on a braking torque required value transmitted from the traveling control ECU 50. The braking torque required value is a target value of braking torque to be applied from the braking devices 16a to 16d to the wheels 18a to 18d. The brake ECU 40 controls the hydraulic braking system 20 so that the sum of the braking torque applied from the braking devices 16a to 16d to the wheels 18a to 18d, respectively, reaches the braking torque required value.

The traveling control ECU 50 executes a program previously stored in the ROM thereof to integrally control travel of the vehicle 10. In the present embodiment, the traveling control ECU 50 corresponds to a control device. The traveling control ECU 50 has, as functional elements implemented by executing the program, for example, an information acquisition unit 51, a target torque setting unit 52, an MG control unit 53, and a braking indication unit 54.

The information acquisition unit 51 detects and calculates various state quantities of the vehicle 10 based on output signals of the sensors installed in the vehicle 10. For example, the information acquisition unit 51 detects the master cylinder pressure $P_{mc}$, the wheel pressure $P_{wc}$, the wheel speeds $\omega_{wh}(a)$ to $\omega_{wh}(d)$, the MG rotating speeds $\omega_{fmg}$, $\omega_{rmg}$, the driving currents $I_{mg}(a)$, $I_{mg}(b)$, the acceleration $A_{sen}$ of the vehicle 10, the depression amount Sa of the accelerator pedal, and the depression amount Sb of the brake pedal 21. In addition, the information acquisition unit 51 further calculates various state quantities of the vehicle 10 based on detection values of the sensors. For example, the information acquisition unit 51 determines an average value of the wheel speeds $\omega_{wh}(a)$ to $\omega_{wh}(d)$, and, based on the determined average wheel speed, uses an arithmetic expression or the like to calculate a vehicle speed $V_c$, which is a traveling speed of the vehicle 10 and an acceleration $A_{wh}$ of the vehicle 10. In addition, the information acquisition unit 51 calculates time differential values of the respective MG rotating speeds $\omega_{fmg}$, $\omega_{rmg}$ to acquire a rotational acceleration $a_{fmg}$ of the front MG 11a and a rotational acceleration a rmg of the rear MG 11b. Furthermore, the information acquisition unit 51 determines an average value of the MG rotating speeds $\omega_{fmg}$, $\omega_{rmg}$ and uses the determined average value as an MG rotating speed $\omega_{mg}$.

The target torque setting unit 52 acquires the various state quantities of the vehicle 10 from the information acquisition unit 51 and sets a torque indicated value $T_{mg}$*, which is a target value of output torque of the MGs 11a, 11b.

When, for example, detecting depression of the accelerator pedal based on the depression amount Sa of the accelerator pedal acquired from the information acquisition unit 51, the target torque setting unit 52 calculates basic driving torque based on the depression amount Sa of the accelerator pedal using an arithmetic expression, a map, or the like. The basic driving torque is a target value of driving torque to be applied to the wheels 18a to 18d in order to accelerate the vehicle 10. The basic driving torque is set to a positive value when the vehicle 10 is accelerated in the forward movement direction, and is set to a negative value when the vehicle 10 is accelerated in the rearward movement direction. The target torque setting unit 52 calculates a driving torque required value $T_{drv}$, which is a target value of driving torque to be output from the MGs 11a, 11b, from the calculated basic driving torque and transmits the calculated driving torque required value $T_{drv}$ to the MG control unit 53 as a torque indicated value $T_{mg}$*.

In addition, when detecting depression of the accelerator pedal based on the depression amount Sb of the brake pedal 21 acquired from the information acquisition unit 51, the target torque setting unit 52 calculates basic braking torque based on the depression amount Sb of the brake pedal 21 using an arithmetic expression, a map, or the like. The basic braking torque is a target value of braking torque to be applied to the wheels 18a to 18d in order to decelerate the vehicle 10. The basic braking torque is basically set to a negative value. The target torque setting unit 52 calculates a regenerative torque required value $T_{rgr}$, which is a target value of regenerative torque to be output from the MGs 11a, 11b, from the calculated basic braking torque, and transmits the calculated regenerative torque required value $T_{rgr}$ to the MG control unit 53 as the torque indicated value $T_{mg}$*.

The MG control unit 53 controls driving of the MGs 11a, 11b based on the torque indicated value $T_{mg}$* transmitted from the target torque setting section 52. Hence, for example, when the torque indicated value $T_{mg}$* is set to the driving torque required value $T_{drv}$, control is performed so that the sum of the driving torque of each of the MGs 11a, 11b reaches the driving torque required value $T_{drv}$. As a result, driving torque depending on the depression amount Sa of the accelerator pedal is output from the MGs 11a, 11b, whereby the vehicle 10 accelerates in the forward movement direction or the rearward movement direction.

In contrast, when the torque indicated value $T_{mg}$* is set to the regenerative torque required value $T_{rgr}$, control is performed so that the sum of the regenerative torque of each of the MGs 11a, 11b reaches the regenerative torque required value $T_{rgr}$. As a result, regenerative torque depending on the depression amount Sb of the brake pedal 21 is output from the MGs 11a, 11b, whereby the vehicle 10 decelerates.

It is noted that, hereinafter, driving torque and regenerative torque of the MGs 11a, 11b are referred to collectively as output torque of the MGs 11a, 11b.

Incidentally, after the vehicle 10 decelerates by regenerative torque of the MGs 11a, 11b and thereafter stops, if the vehicle 10 can be stopped only by the regenerative torque of the MGs 11a, 11b not using the hydraulic braking system 20, unusual noise can be suppressed from being generated when the vehicle 10 stops, and behavior of the vehicle 10 can be stabilized.

However, when the vehicle 10 stops on a sloping road having a predetermined gradient, since the vehicle 10 is affected by external force in the longitudinal direction due to influence of the force of gravity, braking torque is required to be continuously applied to the wheels 18a to 18d to keep the vehicle 10 in the stopped state against the force of gravity. If regenerative torque corresponding to the braking torque is continuously output from the MGs 11a, 11b, heat may be generated from the MGs 11a, 11b due to motor lock. In addition, there may be situations in which regenerative torque cannot be continuously output from the MGs 11a, 11b due to the regulation of the control or the like. Hence, after the vehicle 10 stops, it is desirable to switch from regenerative torque of the MGs 11a, 11b to braking torque of the hydraulic braking system 20. It is noted that the stop of the vehicle 10 as referred to in the present embodiment may be stopping or parking of the vehicle 10. In addition, the stopped state of the vehicle 10 may be a stopped state or a parked state of the vehicle 10.

Hence, when the vehicle 10 stops on a sloping road or the like, the traveling control ECU 50 performs switching control that switches from the regenerative torque of the MGs 11a, 11b to the braking torque of the braking devices 16a to 16d. As illustrated in FIG. 3, the traveling control ECU 50 further includes a switching control unit 55 that performs the switching control.

For example, after the vehicle 10 starts deceleration due to regenerative operation of the MGs 11a, 11b, the switching control unit 55 monitors change of the vehicle speed $V_c$. If detecting that the vehicle speed $V_c$ is a predetermined switching speed $V_{tha}$ or lower, the switching control unit 55 starts the switching control. Specifically, while gradually decreasing the absolute value of the regenerative torque required value $T_{rgr}$ to be transmitted to the MG control unit 53 as time elapses, the switching control unit 55 transmits braking torque required value $T_{rb}$ corresponding to the decreasing to the brake ECU 40. Hence, after the switching control is started, the braking torque required value $T_{rb}$ gradually increases as time elapses. While the switching control is performed, the sum of the regenerative torque required value $T_{rgr}$ and the braking torque required value $T_{rb}$ g is kept to basic braking torque depending on the depression amount of the brake pedal 21. Since such switching control is performed, the regenerative torque of the MGs 11a, 11b gradually decreases, and the braking torque applied from the hydraulic braking system 20 to the wheels 18a to 18d gradually increases. It is noted that, hereinafter, the regenerative torque required value $T_{rgr}$ is also referred to as a basic regenerative torque required value $T_{rgr}$.

Meanwhile, the switching control unit 55 calculates a stopped time required braking torque $T_{stp}$ during a time period during which the switching control is performed. The stopped time required braking torque $T_{stp}$ is braking torque to be applied from the hydraulic braking system 20 to the wheels 18a to 18d to keep the vehicle 10 in the stopped state after the vehicle 10 stops. For example, the switching control unit 55 acquires, from the information acquisition unit 51, a first deceleration of the vehicle 10 detected based on an output signal of the acceleration sensor 35 and a second deceleration of the vehicle 10 detected based on the wheel speeds $\omega_{wh}(a)$ to $\omega_{wh}(d)$. The first deceleration mainly includes an actual deceleration of the vehicle 10 in the vehicle longitudinal direction and a component of the acceleration of gravity in the vehicle travelling direction. The second deceleration is an actual deceleration of the vehicle 10 in the vehicle longitudinal direction. Hence, the difference value between the first deceleration and the second deceleration is the component of the acceleration of gravity in the vehicle longitudinal direction. Using this, the switching control unit 55 calculates a difference value between the first deceleration and the second deceleration. In addition, based on the calculated difference value, using a predetermined arithmetic expression or the like, the switching control unit 55 calculates deceleration force, which is a gravity component acting on the vehicle 10 in the vehicle longitudinal direction when the vehicle 10 is stopped.

The switching control unit 55 uses, based on the calculated deceleration force, a predetermined arithmetic expression or the like to calculate the stopped time required braking torque $T_{stp}$ and transmits the calculated stopped time required braking torque $T_{stp}$ to the brake ECU 40 as the braking torque required value $T_{rb}$. When the vehicle 10 is stopped, the brake ECU 40 controls the hydraulic braking system 20 based on the braking torque required value $T_{rb}$. Hence, since the stopped time required braking torque $T_{stp}$ is applied from the braking devices 16a to 16d to the wheels 18a, 18b, even when the vehicle 10 is stopped on a sloping road, the stopped state can be kept.

Incidentally, in comparison to control accuracy and response accuracy of the regenerative torque of the MGs 11a, 11b, control accuracy and response accuracy of the braking torque of the hydraulic braking system 20 is low. This causes the braking torque actually applied from the hydraulic braking system 20 to the wheels 18a, 18b deviates from the braking torque required value $T_{rb}$. When the vehicle 10 stops on an upwardly-sloping road, if the braking torque deviates so that the absolute value of the braking torque of the hydraulic braking system 20 decreases, since the braking torque of the hydraulic braking system 20 fails, the vehicle 10 may roll down after stopping.

Meanwhile, although a method of compensating such amount of deviation of the braking torque of the hydraulic braking system 20 by the regenerative torque of the MGs 11a, 11b can be considered, if regenerative torque of the MGs 11a, 11b is determined based on the acceleration of the vehicle 10 as in the control device described in the above PTL 1, the regenerative torque of the MGs 11a, 11b may change greatly when the acceleration of the vehicle 10 has changed suddenly. In such a case, since a great braking force is applied to the vehicle 10, the vehicle 10 may not be smoothly stopped.

Hence, the traveling control ECU 50 of the present embodiment estimates differences between the braking torque required value $T_{rb}$ and actual values of the braking torque applied from the hydraulic braking system 20 to the wheels 18a to 18d based on various state quantities detected and calculated by the information acquisition unit 51. In the present embodiment, the braking torque required value $T_{rb}$ corresponds to an ideal value of braking torque of the braking devices 16a to 16d. Then, the traveling control ECU 50 corrects output torque of the MGs 11a, 11b based on the differences to suppress the braking torque actually applied to the wheels 18a to 18d from deviating from the basic braking torque. In addition, the traveling control ECU 50 provides an upper limit and a lower limit of a regenerative torque indicated value of the MGs 11a, 11b to avoid the absolute value of the output torque of the MGs 11a, 11b from being too excessive when the vehicle 10 is stopped. Hence, the vehicle 10 can be stopped more smoothly.

Hereinafter, the control of the MGs 11a, 11b performed by the traveling control ECU 50 until the vehicle 10 is decelerated and stopped will be described in detail.

As illustrated in FIG. 3, the traveling control ECU 50 further includes, as functional elements implemented by executing the program, a deceleration acquisition unit 60, a gradient disturbance acquisition unit 61, a difference ratio calculation unit 62, a first difference acquisition unit 63, and a second difference acquisition unit 64.

The deceleration acquisition unit 60 calculates a disturbance deceleration difference $Diff_{sum}$, which is a difference between an ideal value $D_i$ and an actual value $D_a$ of a deceleration of the vehicle 10 while the vehicle 10 decelerates.

The actual value $D_a$ of a deceleration of the vehicle 10 is an actual deceleration. The deceleration acquisition unit 60, for example, calculates a differential value of the vehicle speed $V_c$ acquired by the information acquisition unit 51 to acquire the actual value $D_a$ of a deceleration of the vehicle 10.

The ideal value $D_i$ of a deceleration of the vehicle 10 is a deceleration to be generated in the vehicle 10 based on output torque of the MGs 11a, 11b, rolling resistance of a road surface, or the like. The deceleration acquisition unit 60, for example, calculates the ideal value $D_i$ of a deceleration of the vehicle 10 based on the following expression f1. It is noted, in the expression f1, T is torque applied to the wheels 18a to 18d, I is inertia of the vehicle body 17, and R is a radius of tires of the wheels 18a to 18d.

[Expression 1]

$$Di = \frac{T}{I} R \qquad (f1)$$

The inertia I of the vehicle body 17 and the radius R of tires are previously stored in the ROM of the traveling control ECU 50.

The torque T is calculated from the following expression f2 by the information acquisition unit 51. It is noted, in the expression f2, $T_{mg}^*$ is a torque indicated value, $T_{brk}$ is hydraulic braking torque, $I_{fmg}$ is inertia of the front drive shaft 15a, and $a_{fmg}$ is a rotational acceleration of the front MG 11a acquired by the information acquisition unit 51. In addition, $I_{rmg}$ is inertia of the rear drive shaft 15b, $a_{rmg}$ is a rotational acceleration of the rear MG 11b acquired by the information acquisition unit 51, and $T_{road}$ is road surface reaction force torque applied to the wheels 18a to 18d based on the rolling resistance of the road surface.

[Expression 2]

$$T = T_{mg}^* + T_{brk} - I_{fmg}a_{fmg} - I_{rmg}a_{rmg} - Troad \qquad (f2)$$

The torque indicated value $T_{mg}^*$ is, as described above, set by the target torque setting unit 52. In addition, the information acquisition unit 51 calculates hydraulic braking torque $T_{brk}$ based on the following expression f3. It is noted that, in the expression f3, $P_{wc}$ is wheel pressure acquired by the information acquisition unit 51, and BEF is a braking factor.

[Expression 3]

$$Tbrk = Pwc \times BEF \qquad (f3)$$

The braking factor BEF indicates a ratio of the braking torque actually acting on the wheels 18a to 18d to the braking torque of the braking devices 16a to 16d. The braking factor BEF is previously determined as a design value and is stored in the ROM of the traveling control ECU 50. In the present embodiment, the hydraulic braking torque $T_{brk}$ calculated based on the expression f3 corresponds to a predicted value of the braking torque applied from the braking devices 16a to 16d to the wheels 18a to 18d.

The inertia $I_{fmg}$, $I_{rmg}$ in the expression f2 is also previously stored in the ROM of the traveling control ECU 50.

Furthermore, the information acquisition unit 51 calculates road surface reaction force torque $T_{road}$ based on the following expression f4. It is noted that, in the following expression f4, $\alpha$, $\beta$, and $\gamma$ are predetermined coefficients, and $V_c$ is a vehicle speed acquired by the information acquisition unit 51.

[Expression 4]

$$T_{road} = \alpha + \beta \times V_c + \gamma \times V_c^2 \qquad (f4)$$

The coefficients $\alpha$, $\beta$, $\gamma$ are previously stored in the ROM of the traveling control ECU 50.

The information acquisition unit 51 uses the expression f2 based on the torque indicated value $T_{mg}^*$ set by the target torque setting unit 52, the hydraulic braking torque $T_{brk}$ calculated by the expression f3, the inertia $I_{fmg}$, $I_{rmg}$ previously stored in the ROM of the traveling control ECU 50, the rotational accelerations $a_{fmg}$, $a_{rmg}$ acquired by the information acquisition unit 51, and the road surface reaction force torque $T_{road}$ calculated by the expression f4 to calculate basic vehicle torque T. In addition, the deceleration acquisition unit 60 uses the expression f1 based on the calculated basic vehicle torque T to calculate the ideal value $D_i$ of the deceleration of the vehicle 10. The ideal value D, of the deceleration of the vehicle 10 is a deceleration of the vehicle 10 generated based on the basic vehicle torque T.

Herein, the vehicle 10 decelerates by being affected by not only the basic vehicle torque T but also other disturbance torque. The disturbance torque includes gradient disturbance torque affecting the vehicle 10 due to influence of the force of gravity when the vehicle 10 is located on a sloping road, the amount of deviation of the braking torque applied from the braking devices 16a to 16d to the wheels 18a to 18d, and the like. The amount of deviation of the braking torque is an amount of deviation between an actual value of braking torque applied from the hydraulic braking system 20 to the wheels 18a to 18d and the braking torque required value $T_{rb}$. Actually, the vehicle 10 decelerates by being affected by the basic vehicle torque T and the disturbance torque. That is, the actual value $D_a$ of a deceleration of the vehicle 10 calculated from a differential value of the vehicle speed $V_c$t is a deceleration of the vehicle 10 generated based on the basic vehicle torque T and the disturbance torque.

Based on the definitions of the actual value $D_a$ of a deceleration of the vehicle 10 and the ideal value $D_i$ of a deceleration of the vehicle 10 described above, the disturbance deceleration difference $Diff_{sum}$, which is a difference therebetween, is a disturbance deceleration of the vehicle 10 generated based on the amount of deviation of the gradient disturbance torque and the braking torque. Specifically, the deceleration acquisition unit 60 calculates the disturbance deceleration difference $Diff_{sum}$ based on the following f5 from the actual value $D_a$ of the deceleration of the vehicle 10 and the ideal value $D_i$ of the deceleration of the vehicle 10. It is noted that, in the expression f4, LFP indicates a function of a lowpass filter, and $\tau1$ and $\tau2$ indicate time constants of lowpass filters.

[Expression 5]

$$Diff_{sum} = LPF(D_a, \tau_1) - LPF(D_i, \tau_2) \qquad (f5)$$

The time constants $\tau1$, $\tau2$ are previously stored in the ROM of the traveling control ECU 50.

Meanwhile, the gradient disturbance acquisition unit 61 uses the acceleration $A_{sen}$ of the vehicle 10 detected by the acceleration sensor 35 and the acceleration $A_{wh}$ of the vehicle 10 determined from the wheel speeds $\omega_{wh}$(a) to $\omega_{wh}$(d) to calculate an acceleration $A_{slp}$ of the vehicle 10 generated based on a gradient of the road surface on which the vehicle 10 is located. Hereinafter, the acceleration $A_{slp}$ of the vehicle 10 is referred to as a gradient disturbance acceleration $A_{slp}$.

Specifically, the acceleration $A_{sen}$ of the vehicle 10 detected by the acceleration sensor 35 includes not only an actual acceleration of the vehicle 10 but also a gravitational acceleration component of the vehicle 10. In contrast, the acceleration $A_{wh}$ of the vehicle 10 determined from the wheel speeds $\omega_{wh}$(a) to $\omega_{wh}$(d) by the information acquisition unit 51 is an actual acceleration of the vehicle 10. Using this, as indicated by the following expression f6, the gradient disturbance acquisition unit 61 subtracts the acceleration $A_{wh}$ from the acceleration $A_{sen}$ to calculate the gradient disturbance acceleration $A_{slp}$.

[Expression 6]

$$A_{slp} = A_{sen} - A_{whl} \tag{f6}$$

The difference ratio calculation unit 62 uses the disturbance deceleration difference $Diff_{sum}$ calculated by the deceleration acquisition unit 60 and the gradient disturbance acceleration $A_{slp}$ calculated by the gradient disturbance acquisition unit 61 to calculate a difference ratio $R_{pt}$, which is a ratio of the amount of deviation of an actual value to the ideal value of braking torque of the braking devices 16a to 16d. Specifically, based on the following expression f7, the difference ratio calculation unit 62 subtracts the gradient disturbance acceleration $A_{slp}$ from the disturbance deceleration difference $Diff_{sum}$ to calculate a braking disturbance deceleration $Diff_{brk}$. The braking disturbance deceleration $Diff_{brk}$ is a deceleration of the vehicle 10 generated based on the amount of deviation of the braking torque applied from the braking devices 16a to 16d to the wheels 18a to 18d.

[Expression 7]

$$Diff_{brk} = Diff_{sum} - A_{slp} \tag{f7}$$

The difference ratio calculation unit 62 calculates braking disturbance torque $T_{brk, D}$ from the braking disturbance deceleration $Diff_{brk}$ based on the following expression f8. It is noted that, in the expression f8, I indicates inertia of the vehicle body 17, and R is the radius of tires of the wheels 18a to 18d.

[Expression 8]

$$T_{brk,D} = Diff_{brk} \times \frac{I}{R} \tag{f8}$$

The braking disturbance torque $T_{brk, D}$ calculated by the expression 8 indicates the amount of deviation of the braking torque of the braking devices 16a to 16d.

In contrast, the hydraulic braking torque $T_{brk}$ calculated using the above expression f3 indicates an ideal value of the braking torque of the braking devices 16a to 16d.

Hence, as illustrated in the following expression f9, the difference ratio calculation unit 62 divides the braking disturbance torque $T_{brk, D}$ calculated using the expression f8 by the hydraulic braking torque $T_{brk}$ calculated using the above expression f3 to calculate the difference ratio $R_{pt}$. It is noted that, in the expression f9, Filter indicates a function based on, for example, a lowpass filter.

[Expression 9]

$$R_{pt} = Filter\left(\frac{T_{brk,D}}{T_{brk}}\right) \tag{f9}$$

The first difference acquisition unit 63 calculates correction torque $T_{cor}$, based on the following expression f10 from the difference ratio $R_{pt}$ calculated by the difference ratio calculation unit 62, the braking factor BEF stored in the ROM, and the wheel pressure $P_{wc}$ acquired by the information acquisition unit 51

[Expression 10]

$$T_{cor} = P_{wc} \times BEF \times R_{pt} \tag{f10}$$

In the present embodiment, the correction torque $T_{cor}$ corresponds to a first braking torque difference, which is a difference between an ideal value and an actual value of the braking torque of the braking devices 16a to 16d.

When the switching control is performed, that is, when the absolute value of the braking torque required value $T_{rb}$ is increased while the absolute value of the basic regenerative torque required value $T_{rgr}$ is decreased, the switching control unit 55 calculates the torque indicated value $T_{mg}^*$ based on the following expression f11.

[Expression 11]

$$T_{mg}^* = T_{rgr} + T_{cor} \tag{f11}$$

The MG control unit 53 controls output torque of the MGs 11a, 11b based on the torque indicated value $T_{mg}^*$ calculated by the expression f11. Hence, the torque output from the MGs 11a, 11b is controlled to a value obtained by adding the correction torque $T_{cor}$ to the basic regenerative torque required value $T_{rgr}$. As a result, in addition to the regenerative torque corresponding to the basic regenerative torque required value $T_{rgr}$, the torque corresponding the amount of deviation of the braking torque of the braking devices 16a to 16d is output from the MGs 11a, 11b. Hence, the actual braking torque applied to the wheels 18a to 18d is difficult to greatly displace from the basic braking torque. Hence, the vehicle 10 can be stopped more smoothly.

When the vehicle 10 is stopped on a sloping road, if the stopped state of the vehicle 10 cannot be kept only by braking torque of the braking devices 16a to 16d, the second difference acquisition unit 64 calculates a correction value $T_{slp}$ of output torque of the MGs 11a, 11b corresponding to the braking torque deficit. Hereinafter, the correction value $T_{slp}$ of output torque is referred to as a gradient correction torque $T_{slp}$. In the present embodiment, the gradient correction torque $T_{slp}$ corresponds to a second braking torque difference, which is a difference between braking torque required for keeping the stopped state of the vehicle 10 when the vehicle 10 is stopped and braking torque of the braking devices 16a to 16d.

Specifically, the second difference acquisition unit 64 calculates the gradient correction torque $T_{slp}$ based on the following expression f12. It is noted that, in the expression f12, K is a feedback coefficient, $\Omega_{mg}$ is an MG rotating speed acquired by the information acquisition unit 51, and $T_0$ is an initial value of the gradient correction torque.

[Expression 12]

$$T_{slp} = -\int (k \times \omega_{mg}) + T_0 \tag{f12}$$

The feedback coefficient K is previously stored in the ROM of the traveling control ECU 50. The second difference acquisition unit 64 uses the integral term of the expression f12 as a time integral value based on elapsed time from the start of the switching control to the present time.

In addition, the second difference acquisition unit 64 calculates an initial value $T_0$ of the gradient correction torque based on the following expression f13. It is noted, in the expression f13, M is weight of the vehicle 10, $A_{slp}$ is an acceleration of the vehicle 10 generated based on a gradient of the road surface on which the vehicle 10 is located, R is a radius of tires. DEF is a gear ratio of the tires from the MGs 11a, 11b to the wheels 18c, 18d.

[Expression 13]

$$T_0 = M \times A_{slp} \times \frac{R}{DEF} \quad \text{(f13)}$$

The weight M, the radius R of the tires, and the gear ratio DEF of the vehicle 10 are previously stored in the ROM of the traveling control ECU 50. As the acceleration $A_{slp}$ of the vehicle 10, a calculated value of the above expression f6 is used.

When the vehicle 10 is stopped, the switching control unit 55 sets the gradient correction torque $T_{slp}$ to the torque indicated value $T_{mg}*$ as illustrated in the following expression f14.

[Expression 14]

$$T_{mg}^* = T_{slp} \quad \text{(f14)}$$

In this regard, the switching control unit 55 sets the larger one of the absolute value $|T_{rgr}|$ of the basic regenerative torque required value and the absolute value $|T_{cor}|$ of the correct torque to an upper limit of the torque indicated value $T_{mg}*$. In addition, the switching control unit 55 sets the smaller one of $-|T_{rgr}|$ and $-|T_{cor}|$ to a lower value of the torque indicated value $T_{mg}*$.

The MG control unit 53 controls output torque of the MGs 11a, 11b based on the torque indicated value $T_{mg}*$. Hence, the torque output from the MGs 11a, 11b is controlled to the gradient correction torque $T_{slp}$. As a result, when the stopped state of the vehicle 10 cannot be kept only by braking torque of the braking devices 16a to 16d, since the torque corresponding to the braking torque deficit is output from the MGs 11a, 11b, the vehicle 10 can be kept in the stopped state.

Next, a procedure of a specific process performed by the elements of the traveling control ECU 50 described above will be described with reference to FIG. 4 to FIG. 6.

The traveling control ECU 50 repeatedly performs the process illustrated in FIG. 4 at predetermined periods. As illustrated in FIG. 4, first, in the traveling control ECU 50t, as processing of step S10, the information acquisition unit 51 determines whether a Ready signal of the vehicle 10 is an on state. The vehicle 10 is provided with a Ready switch operated by the driver when the vehicle 10 is started.

The Ready signal is an output signal of the Ready switch. When the driver turns on the Ready switch, the Ready signal becomes an on state. Hence, the processing of step S10 corresponds to processing determining whether the vehicle 10 has started.

If making an affirmative determination in the processing of step S10, that is, if the Ready switch is in an on state, as processing of step S11, the information acquisition unit 51 determines whether the hydraulic braking torque $T_{brk}$ is a predetermined torque threshold value $T_{th}$ or larger. Specifically, the information acquisition unit 51 calculates the hydraulic braking torque $T_{brk}$ based on the above expression f3 from the wheel pressure $P_{wc}$ detected by the wheel pressure sensor 31 and the braking factor BEF previously stored in the ROM. The torque threshold value $T_{th}$ is previously determined by experiment or the like so as to be able to determine whether the brake pedal 21 has been depressed and is stored in the ROM of the traveling control ECU 50.

If making an affirmative determination in the processing of step S11, that is, if the hydraulic braking torque $T_{brk}$ is the torque threshold value $T_{th}$ or larger, the information acquisition unit 51 determines that the brake pedal 21 has been depressed. In this case, the traveling control ECU 50 performs processing of calculating the difference ratio $R_{pt}$ as processing of step S12. The specific procedure of the deviation ratio calculation process is illustrated in FIG. 5

As illustrated in FIG. 5, in the deviation ratio calculation process, first, as processing of step S20, the deceleration acquisition unit 60 calculates the disturbance deceleration difference $Diff_{sum}$. Specifically, the deceleration acquisition unit 60 calculates the disturbance deceleration difference $Diff_{sum}$ based on the above expression f5 from the actual value $D_a$ of the deceleration of the vehicle 10 calculated from the differential value of the vehicle speed $V_c$ and the ideal value $D_i$ of the deceleration of the vehicle 10 calculated by the above expressions f1 to f4.

As processing of step 21 following step S20, the gradient disturbance acquisition unit 61 calculates the gradient disturbance acceleration $A_{slp}$ based on the above expression f6 from the acceleration $A_{sen}$ of the vehicle 10 detected by the acceleration sensor 35 and the acceleration $A_{wh}$ of the vehicle 10 determined from the wheel speeds $\omega_{wh}(a)$ to $\omega_{wh}(d)$.

As processing of step S22 following step S21, the difference ratio calculation unit 62 calculates the braking disturbance deceleration $Diff_{brk}$ based on the above expression f7 from the disturbance deceleration difference $Diff_{sum}$ and the gradient disturbance acceleration $A_{slp}$ respectively obtained by the processing of steps S20 and S21.

As processing of step S23 following step S22, the difference ratio calculation unit 62 calculates the difference ratio $R_{pt}$. Specifically, the difference ratio calculation unit 62 calculates the braking disturbance torque $T_{brk, D}$ based on the above expression f8 from the braking disturbance deceleration $Diff_{brk}$ obtained by the processing of step S22. In addition, the difference ratio calculation unit 62 uses the above expression f3 to calculate the hydraulic braking torque $T_{brk}$. Then, the difference ratio calculation unit 62 calculates the difference ratio $R_{pt}$ based on the above expression f9 from the braking disturbance torque $T_{brk, D}$ and the hydraulic braking torque $T_{brk}$.

Using the difference ratio $R_{pt}$ determined as descried above can calculate the correction torque $T_{cor}$ based on the above expression f10. In order to increase accuracy in calculating the correction torque $T_{cor}$, the traveling control ECU 50 of the present embodiment determines an average value of the difference ratio $R_{pt}$ during a time period during which the brake pedal 21 is depressed and calculates the correction torque $T_{cor}$ based on the determined average value of the difference ratio $R_{pt}$.

Specifically, as processing of step S24 following step S23, the difference ratio calculation unit 62 calculates a difference ratio integrated value $Sum_{R, n}$ and a time integrated value $Sum_{T, n}$. The difference ratio calculation unit 62 calculates the difference ratio integrated value $Sum_{R,n}$ based on the following expression f15. It is noted that, in the expression f15, $Sum_{R,n-1}$ is a previous value of the difference ratio integrated value $Sum_{R,n}$ and $\Delta T$ is predetermined minute time.

[Expression 15]

$$Sum_{R,n} = Sum_{R,n-1} + \Delta T \times R_{pt} \qquad (f15)$$

In addition, the difference ratio calculation unit 62 calculates the time integrated value $Sum_{T,n}$ based on the following expression f16. It is noted that, in the expression f16, $Sum_{T,n-1}$ is a previous value of the time integrated value $Sum_{T,n}$.

[Expression 16]

$$Sum_{T,n} = Sum_{T,n-1} + \Delta T \qquad (f16)$$

As processing of step S25 following step S24, the information acquisition unit 51 determines whether the hydraulic braking torque $T_{brk}$ is the predetermined torque threshold value $T_{th}$ or larger. Processing of step S26 is similar to the processing of step S11 in FIG. 4. If making an affirmative determination in the processing of step S26, that is, if determining that the brake pedal 21 has been depressed, the information acquisition unit 51 returns to the processing of step S20. Hence, during the time period during which the brake pedal 21 is depressed, the processing of steps S20 to S25 is repeatedly performed. Thus, the difference ratio integrated value $Sum_{R,n}$ and the time integrated value $Sum_{T,n}$ during the time period during which the brake pedal 21 is depressed can be determined.

Thereafter, if a negative determination is made in the processing of step S25, that is, when the depression of the brake pedal 21 is released, as the processing of step S26, the difference ratio calculation unit 62 calculates an average value $Ave(R_{pt})_n$ of the deviation ratio based on the following expression f17.

[Expression 17]

$$Ave(R_{pt})_n = \frac{Sum_{R,n}}{Sum_{T,n}} \qquad (f17)$$

Although the average value $Ave(R_{pt})_n$ of the deviation ratio can be calculated by the above processing, for example, when the depression time of the brake pedal 21 is extremely short, the calculated value may include a large error. If the average value $Ave(R_{pt})_n$ of the deviation ratio includes a large error, when the correction torque $T_{cor}$ is calculated from the calculated value based on the above expression f10, the correction torque $T_{cor}$ may be set to an incorrect value. Hence, for example, if the correction torque $T_{cor}$ changes greatly, output torque of the MGs 11a, 11b changes greatly, which is undesirable.

Hence, if a difference between the current average value $Ave(R_{pt})_n$ of the deviation ratio calculated when the current depression operation of the brake pedal 21 is performed and the previous average value $Ave(R_{pt})_{n-1}$ of the deviation ratio calculated when the previous depression operation of the brake pedal 21 is performed is a predetermined value N or larger, the difference ratio calculation unit 62 limits the amount of change of the average value $Ave(R_{pt})_n$ of the deviation ratio to the predetermined value N.

Specifically, as processing of step S27 following step S26, the difference ratio calculation unit 62 sets the average value $Ave(R_{pt})_n$ of the deviation ratio stored in the RAM to the previous average value $Ave(R_{pt})_{n-1}$.

As processing of step S28 following step S27, the difference ratio calculation unit 62 calculates a difference value $Diff_R$ based on the following expression f18.

[Expression 18]

$$Diff_R = Ave(R_{pt})_n - Ave(R_{pt})_{n-1} \qquad (f18)$$

As processing of step S29 following step S28, the difference ratio calculation unit 62 determines whether the absolute value $|Diff_R|$ of the difference value is the predetermined value N or larger. If an affirmative determination is made in the processing of step S29, that is, if the absolute value $|Diff_R|$ of the difference value is the predetermined value N or larger, the difference ratio calculation unit 62 performs processing of step S30. Specifically, the difference ratio calculation unit 62 resets the current average value $Ave(R_{pt})_n$ of the deviation ratio based on the following expression f19. It is noted that, in the following expression f19, sign is a signum function.

[Expression 19]

$$Ave(R_{pt})_n = Ave(R_{pt})_{n-1} + \mathrm{sign}(Diff_R) \times N \qquad (f19)$$

Hence, if the absolute value $|Diff_R|$ of the difference value is the predetermined value N or larger, the current average value $Ave(R_{pt})_n$ of the deviation ratio is limited to a value obtained by adding or subtracting the predetermined value N to or from the previous average value $Ave(R_{pt})_{n-1}$.

As processing of step S31 following step S30, after storing the current average value $Ave(R_{pt})_n$ of the deviation ratio in the ROM, the difference ratio calculation unit 62 terminates the process illustrated in FIG. 5.

In contrast, if a negative determination is made in the processing of step S29, that is, if the absolute value $|Diff_R|$ of the difference value is smaller than the predetermined value N, after storing the current average value $Ave(R_{pt})_n$ of the deviation ratio in the RAM without change as the processing of step S31, the difference ratio calculation unit 62 terminates the process illustrated in FIG. 5.

Since the processes illustrated in FIG. 4 and FIG. 5 are performed, every time a depression operation of the brake pedal 21 of the vehicle 10 is performed, the average value $Ave(R_{pt})_n$ of the deviation ratio is updated, and the value is stored in the RAM.

While the switching control is performed, the traveling control ECU 50 corrects the basic regenerative torque required value $T_{rgr}$ using the average value $Ave(R_{pt})_n$ of the deviation ratio. Next, a specific procedure of a correction process for the basic regenerative torque required value $T_{rgr}$ performed by the traveling control ECU 50 will be described with reference to FIG. 6. It is noted that the traveling control ECU 50 repeatedly performs the process illustrated in FIG. 6 at predetermined calculation periods.

Figure 6:
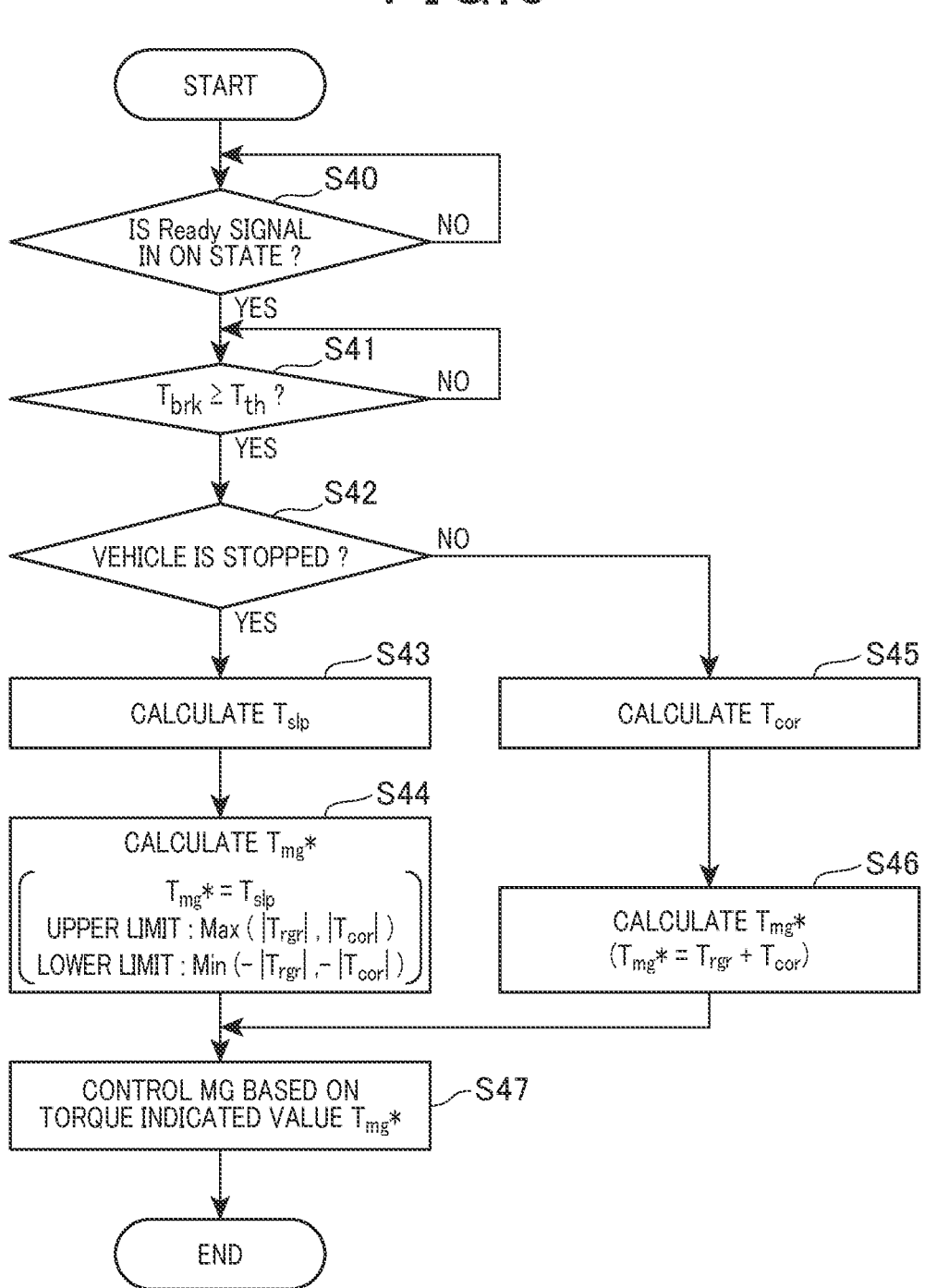
FIG. 6 is a flowchart illustrating a procedure of a process performed by the traveling control ECU according to the embodiment.

As illustrated in FIG. 6, in the traveling control ECU 50, first, as processing of step S40, the information acquisition unit 51 determines whether the Ready signal of the vehicle 10 is an on state. In addition, if making an affirmative determination in the processing of step S40, the information acquisition unit 51 determines, as processing of step S41, whether the hydraulic braking torque $T_{brk}$ is the predetermined torque threshold value $T_{th}$ or larger. Since the processing of steps S40 and S41 is the same as the processing of steps S10 and S11 illustrated in FIG. 4, detailed descriptions of which are omitted.

If making an affirmative determination in the processing of step S41, that is, if the brake pedal 21 has been depressed, as processing of step S42, the information acquisition unit 51 determines whether the vehicle 10 has been stopped.

Specifically, in the processing of step S42, for example, the information acquisition unit 51 determines whether the following expression f20 is satisfied. It is noted that, in the following expression f20, $V_{ca}$ is a vehicle speed that can be calculated using an arithmetic expression or the like from the average value of the wheel speeds $\omega_{wh}(a)$ to $\omega_{wh}(d)$, and $V_{cb}$ is a vehicle speed that can be calculated using an arithmetic expression or the like from the MG rotating speeds $\omega_{fmg}$, $\omega_{rmg}$. In addition, $V_{thb}$ is a threshold value that is preset so as to be able to determine whether the vehicle has been stopped and is stored in the ROM of the traveling control ECU 50. Max is a function for selecting the higher one of the vehicle speeds $V_{ca}$ and $V_{cb}$. The speed threshold value $V_{thb}$ is set to, for example, 0 km/h.

[Expression 20]

$$Max(V_{ca}, V_{cb}) \le V_{thb} \qquad (f20)$$

After the brake pedal 21 is depressed, until the vehicle 10 stops, the information acquisition unit 51 makes a negative determination in the processing of step S42. In this case, as processing of step S45, the first difference acquisition unit 63 calculates the correction torque $T_{cor}$ using the above expression f10. In this case, the first difference acquisition unit 63 reads the average value $Ave(R_{pt})_n$ of the deviation ratio stored in the RAM and uses the average value $Ave(R_{pt})_n$ of the deviation ratio as the difference ratio $R_{pt}$ in the expression f10.

As the processing of step S46 following step S45, the switching control unit 55 sets the torque indicated value $T_{mg}^*$ based on the above expression f11 while the switching control is performed. Next, as processing of step S47, the MG control unit 53 controls output torque of the MGs 11a, 11b based on the torque indicated value $T_{mg}^*$. Hence, the torque output from the MGs 11a, 11b is controlled to a value obtained by adding the correction torque $T_{cor}$ to the basic regenerative torque required value $T_{rgr}$.

Thereafter, when the vehicle 10 stops, the information acquisition unit 51 makes an affirmative determination in the processing of step S42. In this case, as processing of step S43, the second difference acquisition unit 64 uses the above expression f12 to calculate the gradient correction torque $T_{slp}$. In addition, as processing of step S44 following step S43, the switching control unit 55 sets the torque indicated value $T_{mg}^*$ based on the above expression f14. In this case, the switching control unit 55 sets the larger one of the absolute value $|T_{rgr}|$ of the basic regenerative torque required value and the absolute value $|T_{cor}|$ of the correct torque to an upper limit of the torque indicated value $T_{mg}^*$. In addition, the switching control unit 55 sets the smaller one of $-|T_{rgr}|$ and $-|T_{cor}|$ to a lower limit of the torque indicated value $T_{mg}^*$. Next, as processing of step S47, the MG control unit 53 controls output torque of the MGs 11a, 11b based on the torque indicated value $T_{mg}^*$. Hence, the torque output from the MGs 11a, 11b is basically controlled to the gradient correction torque $T_{slp}$.

Next, referring to FIGS. 7(A) to 7(F), an operation example of the vehicle 10 of the present embodiment will be described.

Figures 7A, 7B, 7C, 7D, 7E, 7F:
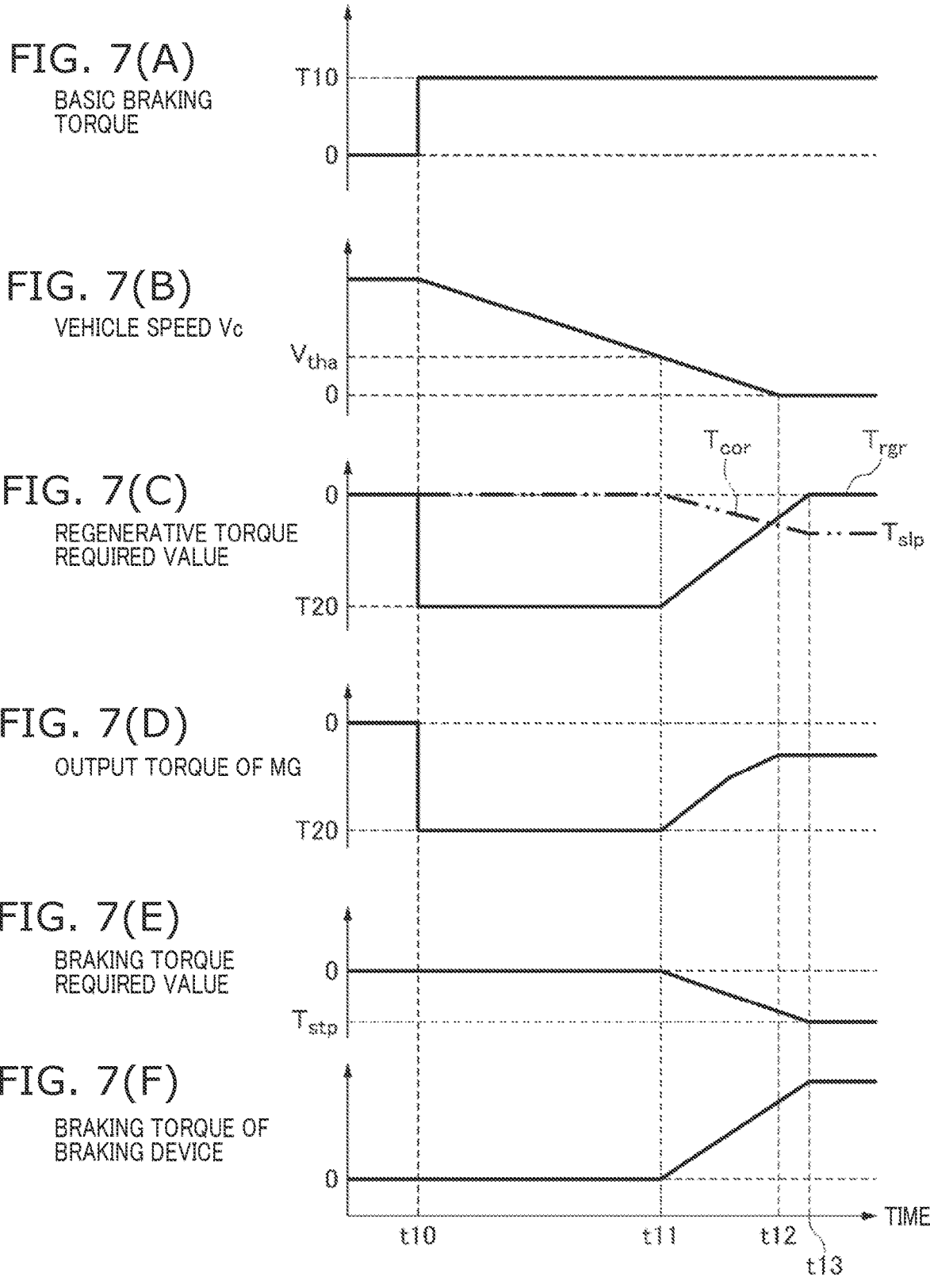
FIGS. 7(A) to 7(F) are timing diagrams illustrating changes of basic braking torque, vehicle speed, a regenerative torque required value, output torque of an MG, a braking torque required value, and braking torque of a braking device of the vehicle according to the embodiment.

As illustrated in FIGS. 7(A) to 7(F), if the brake pedal 21 is depressed at time t10, as illustrated in FIG. 7(A), the target torque setting unit 52 sets the basic braking torque to a value T10 depending on the depression amount Sb of the brake pedal 21. In addition, as illustrated in FIG. 7(C), the target torque setting unit 52 sets the basic regenerative torque required value $T_{rgr}$ to predetermined regenerative torque T20 depending on the basic braking torque T10 and transmits the basic regenerative torque required value $T_{rgr}$ to the MG control unit 53 as the torque indicated value $T_{mg}^*$. It is noted that the predetermined regenerative torque T20 is a negative value. The MG control unit 53 controls the MGs 11a, 11b based on the torque indicated value $T_{mg}^*$. Hence, as illustrated in FIG. 7(D), the sum of output torque of the MGs 11a, 11b is controlled to the predetermined regenerative torque T20. As a result, as illustrated in FIG. 7(B), the vehicle speed $V_c$ gradually decreases.

Thereafter, when the vehicle speed $V_c$ decreases to the switching speed $V_{tha}$ at time t11, the switching control unit 55 starts the switching control. Hence, after time t11, the switching control unit 55 gradually decreases the absolute value $|T_{rgr}|$ of the basic regenerative torque required value from the absolute value $|T20|$ of the predetermined regenerative torque as illustrated in FIG. 7(C), and gradually increases the absolute value $|T_{rb}|$ of the braking torque required value as illustrated in FIG. 7(E). As a result, the absolute value of the output torque of the MGs 11a, 11b gradually decreases from the absolute value $|T20|$ of the predetermined regenerative torque as illustrated in FIG. 7(D), and the absolute value of the braking torque of the braking devices 16a to 16d gradually increases as illustrated in FIG. 7(F).

At this time, the torque indicated value $T_{mg}^*$ of the MGs 11a, 11b is set to a value obtained by adding the correction torque $T_{cor}$ to the basic regenerative torque required value $T_{rgr}$ based on the above expression f11. For example, the correction torque $T_{cor}$ is set as indicated by an alternate long and two short dashes line in FIG. 7(C). Hence, the MGs 11a, 11b output, in addition to the regenerative torque corresponding to the regenerative torque required value $T_{rgr}$, the torque corresponding the amount of deviation of the braking torque of the braking devices 16a to 16d. Hence, the actual braking torque applied to the wheels 18a to 18d is difficult to greatly displace from the basic braking torque T10. Hence, the vehicle 10 can be stopped more smoothly.

Thereafter, as illustrated in FIG. 7(B), when the vehicle speed $V_c$ decreases to 0 km/h at time t12, that is, when the vehicle stops, while the basic regenerative torque required value $T_{rgr}$ is set to 0 at following time t13 as illustrated in FIG. 7(C), the braking torque required value $T_{rb}$ is set to the stopped time required braking torque $T_{stp}$ as illustrated in FIG. 7(E). Hence, the stopped time required braking torque $T_{stp}$ is applied from the braking devices 16a to 16d to the wheels 18a to 18d. If the vehicle 10 cannot be kept in the stopped state only by the stopped time required braking torque $T_{stp}$ output from the braking devices 16a to 16d, the gradient correction torque $T_{slp}$ is output from the MGs 11a, 11b as indicated by an alternate long and two short dashes line in FIG. 7(C). The gradient correction torque $T_{slp}$ can keep the stopped state of the vehicle 10 more reliably.

According to the traveling control ECU 50 of the present embodiment described above, functions and effects described in the following (1) to (6) can be obtained.

(1) The switching control unit 55 corrects output torque of the MGs 11$a$, 11$b$ based on the correction torque $T_{cor}$ corresponding to the first braking torque difference during a time period after the switching control is started and until the information acquisition unit 51 detects the stopped state of the vehicle 10. In addition, after the information acquisition unit 51 detects the stopped state of the vehicle 10, the switching control unit 55 corrects output torque of the MGs 11$a$, 11$b$ based on the gradient correction torque $T_{slp}$ corresponding to the second braking torque difference. Hence, since torque corresponding to the deviation of the braking torque of the braking devices 16$a$ to 16$d$ is output from the MGs 11$a$, 11$b$, while the output torque of the MGs 11$a$, 11$b$ is suppressed from suddenly changing, a state in which braking force of the vehicle 10 fails is difficult to occur. Thus, the vehicle 10 can be stopped more smoothly.

(2) The information acquisition unit 51 detects the wheel pressure $P_{wc}$ by the wheel pressure sensor 31 and calculates the hydraulic braking torque $T_{brk}$ from the detected wheel pressure $P_{wc}$ based on the above expression 3. The first difference acquisition unit 63 uses the above expressions f9 and f10 to calculate the correction torque $T_{cor}$ corresponding to the first braking torque difference from the hydraulic braking torque $T_{brk}$. According to this configuration, the first braking torque difference, which indicates a difference between an ideal value and an actual value of the braking torque of the braking devices 16$a$ to 16$d$, can be determined easily.

(3) The deceleration acquisition unit 60 acquires the disturbance deceleration difference $Diff_{sum}$, which is a difference between an ideal value $D_i$ and an actual value $D_a$ of a deceleration of the vehicle 10 based on the above expression f5. Based on the above expression f6, the gradient disturbance acquisition unit 61 acquires a gradient disturbance acceleration $A_{slp}$ generated in the vehicle 10 depending on a gradient of a road surface on which the vehicle 10 is located. As indicated in the above expression f7, the difference ratio calculation unit 62 subtracts the gradient disturbance acceleration $A_{slp}$ from the disturbance deceleration difference $Diff_{sum}$ to determine the braking disturbance deceleration $Diff_{brk}$. In addition, based on the above expression f8, the difference ratio calculation unit 62 calculates the braking disturbance torque $T_{brk,\,D}$ from the braking disturbance deceleration $Diff_{brk}$. In addition, as indicated in the above expression f9, the difference ratio calculation unit 62 divides the braking disturbance torque $T_{brk,\,D}$ by the hydraulic braking torque $T_{brk}$ calculated by the above expression f3 to calculate the difference ratio $R_{pt}$. Focusing of the above expression f3 indicating that a value obtained by multiplying the wheel pressure $P_{wc}$ by the braking factor BEF is the hydraulic braking torque $T_{brk}$, the first difference acquisition unit 63 calculates the correction torque $T_{cor}$ based on the expression f10, that is, by multiplying the hydraulic braking torque $T_{brk}$ by the difference ratio $R_{pt}$. According to this configuration, the correction torque $T_{cor}$ corresponding to the first braking torque difference can be calculated easily.

(4) The difference ratio calculation unit 62 calculates the average value $Ave(R_{pt})_n$ of the difference ratio during a time period after depression of the brake pedal 21 is detected and until release of the depression is detected. The first difference acquisition unit 63 calculates the correction torque $T_{cor}$ by multiplying the hydraulic braking torque $T_{brk}$ by the average value $Ave(R_{pt})_n$ of the difference ratio. According to this configuration, the correction torque $T_{cor}$ corresponding to the first braking torque difference can be calculated with higher accuracy.

(5) As indicated in the above expression f11, the switching control unit 55 adds the correction torque $T_{cor}$ to the regenerative torque required value $T_{rgr}$ during a time period after the switching control is started and until the stopped state of the vehicle 10 is detected, to correct the output torque of the MGs 11$a$, 11$b$. According to this configuration, the torque depending on the amount of deviation of the braking torque of the braking devices 16$a$ to 16$d$ is output from the MGs 11$a$, 11$b$. Hence, the actual braking torque applied to the wheels 18$a$ to 18$d$ is difficult to greatly displace from the basic braking torque T10. Hence, the vehicle 10 can be stopped more smoothly.

(6) As illustrated in step S44 in FIG. 6, the switching control unit 55 sets an upper limit of the output torque to Max ($|T_{rgr}|$, $|T_{cor}|$) and sets a lower limit of the output torque to Mix ($-|T_{rgr}|$, $-|T_{cor}|$), after the stopped state of the vehicle 10 is detected and when the output torque of the MGs 11$a$, 11$b$ is corrected. According to this configuration, the absolute value of the output torque of the MGs 11$a$, 11$b$ can be avoided from being too excessive after the vehicle is stopped.

It is noted that the above embodiment may be implemented as below.

The vehicle 10 is not limited to an electric vehicle but may be a hybrid vehicle using an engine and an MG as power sources. It is noted that when the vehicle 10 is a hybrid vehicle, the torque indicated value $T_{mg}$* used in the expression f2 may be a value obtained by adding a torque indicated value of the MG to direct torque that is a torque indicated value of the engine.

The configuration of the above embodiment can be applied to not only the vehicle 10 but also any movable body.

The traveling control ECU 50 disclosed in the present disclosure and the control method executed by the traveling control ECU 50 may be implemented by one or more dedicated computers including a processor and a memory programmed to execute one or more functions embodied by computer programs. The traveling control ECU 50 disclosed in the present disclosure and the control method executed by the traveling control ECU 50 may be implemented by a dedicated computer including a processor formed of one or more dedicated hardware logical circuits. The traveling control ECU 50 disclosed in the present disclosure and the control method executed by the traveling control ECU 50 may be implemented by one or more dedicated computers including a combination of a processor and a memory programmed to execute one or more functions and a processor including one or more hardware logical circuits. The computer programs may be stored, as instructions to be executed by a computer, in a computer-readable non-transient tangible storage medium. The dedicated hardware logical circuit and the hardware logical circuit may be implemented by a digital circuit including a plurality of logical circuits or an analog circuit.

The present disclosure is not limited to the above examples. Configurations to which design change is made by a person skilled in the art are also included in the scope of the present disclosure as long as the configurations include a feature of the present disclosure. The elements included in the examples described above, and the arrangements, conditions, shapes, and the like of the elements are not limited but can be modified appropriately. The elements included in the examples described above can be appropriately combined with each other unless technical inconsistency is caused.

A control device (50) according to an aspect of the present disclosure is installed in a vehicle (10) that has a braking device (16*a* to 16*d*) capable of applying braking torque to a wheel (18*a* to 18*d*) and a rotating electrical machine (11*a*, 11*b*) capable of applying braking torque to the wheel by regenerative operation. The control device includes a switching control unit (55), an information acquisition unit (51), and a difference acquisition unit (64). The switching control unit performs switching control that increases braking torque of the braking device while decreasing braking torque of the rotating electrical machine, when the vehicle is decelerated. The information acquisition unit acquires information on a state of the vehicle. The difference acquisition unit acquires a braking torque difference indicating a difference between braking torque required for keeping a stopped state of a vehicle and braking torque of the braking device, when the vehicle is stopped. After the information acquisition unit detects the stopped state of the vehicle, the switching control unit corrects output torque of the rotating electrical machine based on the braking torque difference.

According to the above configuration, after the vehicle is stopped, the braking torque depending on the braking torque difference is output from the rotating electrical machine. That is, torque corresponding to a difference between braking torque required for keeping the stopped state of the vehicle and braking torque of the braking device is output from the rotating electrical machine. Hence, since torque corresponding to the deviation of the braking torque of the braking device is output from the rotating electrical machine, while the output torque of the rotating electrical machine is suppressed from suddenly changing, a state in which braking force of the vehicle fails is difficult to occur. Thus, the vehicle can be stopped more smoothly.

What is claimed is:

1. A control device for a movable body, the control device being installed in the movable body that has a braking device capable of applying braking torque to a wheel and a rotating electrical machine capable of applying braking torque to the wheel by regenerative operation, the control device comprising a memory storing a program and a processor that is operatively coupled to the memory and:

performs switching control that increases braking torque of the braking device while decreasing braking torque of the rotating electrical machine, when the movable body is decelerated;

acquires information on a state of the movable body; and acquires a second braking torque difference indicating a difference between braking torque required for keeping a stopped state of the vehicle and braking torque of the braking device, when the movable body is stopped, wherein after the processor detects the stopped state of the movable body, the processor corrects output torque of the rotating electrical machine based on the braking torque difference, the processor further acquires a first braking torque difference indicating a difference between an ideal value and an actual value of braking torque of the braking device while the movable body decelerates, the processor corrects the output torque of the rotating electrical machine based on the first braking torque difference during a time period after the switching control is started and until the processor detects the stopped state of the movable body, the movable body has a wheel cylinder that applies fluid pressure to the braking device to drive the braking device, the processor detects pressure of the wheel cylinder and calculates a predicted value of the braking torque applied from the braking device to the wheel based on the detected pressure of the wheel cylinder, the processor calculates the first braking torque difference based on the predicted value of the braking torque, the processor acquires a deceleration difference, which is a difference between an ideal value and an actual value of a deceleration of the movable body;

the processor acquires a gradient disturbance acceleration generated in the movable body depending on a gradient of a road surface on which the movable body is located, the processor divides braking torque, which corresponds to a value obtained by subtracting the gradient disturbance acceleration from the deceleration difference, by a predicted value of the braking torque to calculate a difference ratio, and the processor multiplies the predicted value of the braking torque by the difference ratio to calculate the first braking torque difference.

2. The control device for a movable body according to claim 1, wherein the processor calculates an average value of the difference ratio during a time period after depression of a brake pedal of the movable body is detected and until release of the depression of the brake pedal is detected, and the processor multiplies the predicted value of the braking torque by the average value of the difference ratio to calculate the first braking torque difference.

3. The control device for a movable body according to claim 1, wherein the processor adds the first braking torque difference to a torque required value required for the rotating electrical machine during a time period after the switching control is started and until the processor detects the stopped state of the movable body, to correct the output torque of the rotating electrical machine.

4. The control device for a movable body according to claim 1, wherein the processor provides an upper limit to the output torque of the rotating electrical machine after the processor detects the stopped state of the movable body and when the output torque of the rotating electrical machine is corrected.

5. The control device for a movable body according to claim 4, wherein the processor sets, as the upper limit, at least one of the first braking torque difference and a torque required value required for the rotating electrical machine.

6. The control device for a movable body according to claim 1, wherein the processor provides a lower limit to the output torque of the rotating electrical machine after the processor detects the stopped state of the movable body and when the output torque of the rotating electrical machine is corrected.

7. The control device for a movable body according to claim 6, wherein the processor sets, as the lower limit, at least one of the first braking torque difference and a torque required value required for the rotating electrical machine.

* * * * *